(12) United States Patent
Asano (10) Patent No.: US 8,063,538 B2
(45) Date of Patent: Nov. 22, 2011

(54) ULTRASONIC MOTOR

(75) Inventor: Hiroshi Asano, Omihachiman (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 12/904,229

(22) Filed: Oct. 14, 2010

(65) Prior Publication Data

US 2011/0025167 A1 Feb. 3, 2011

Related U.S. Application Data (63) Continuation of application No. PCT/JP2009/002182, filed on May 18, 2009.

(30) Foreign Application Priority Data

May 27, 2008 (JP) ................. 2008-138028

(51) Int. Cl.
*H01L 41/08* (2006.01)
(52) U.S. Cl. .......... 310/323.06; 310/323.03; 310/323.04
(58) Field of Classification Search ............. 310/323.03, 310/323.04, 323.06
See application file for complete search history.

(56) References Cited

U.S. PATENT DOCUMENTS

| | | | |
|---|---|---|---|
| 4,562,374 A | 12/1985 | Sashida | |
| 4,829,209 A * | 5/1989 | Kawasaki et al. | 310/323.06 |
| 5,134,348 A * | 7/1992 | Izukawa et al. | 318/116 |
| 5,408,156 A * | 4/1995 | Kawasaki et al. | 310/323.06 |
| 5,471,108 A | 11/1995 | Guyomar et al. | |
| 6,943,481 B2 * | 9/2005 | Okamoto et al. | 310/323.06 |
| 7,723,900 B2 * | 5/2010 | Ellesgaard et al. | 310/323.04 |
| 2008/0309193 A1 * | 12/2008 | Ellesgaard et al. | 310/316.02 |

FOREIGN PATENT DOCUMENTS

| | | |
|---|---|---|
| JP | 59-96881 | 6/1984 |
| JP | 1-17354 | 3/1989 |
| JP | 6-319273 | 11/1994 |
| JP | 7-194151 A | 7/1995 |
| JP | 11-187677 A | 7/1999 |
| JP | 2001-157473 A | 6/2001 |
| WO | WO-2009-144885 | 12/2009 |

OTHER PUBLICATIONS

PCT/JP2009/002182 Written Opinion dated Apr. 8, 2009.

* cited by examiner

*Primary Examiner* — Mark Budd
(74) *Attorney, Agent, or Firm* — Dickstein Shapiro LLP (57) ABSTRACT

An ultrasonic motor includes a stator and a rotor. In the stator, an n number of piezoelectric elements (wherein n is a natural number) are affixed to one surface of a vibrating member, whose outer circumferential edge is circular or polygonal, along a direction in which the outer circumferential edge extends. Each of the piezoelectric elements has a size corresponding to $\lambda_\theta/2$ in terms of center angle, and the piezoelectric elements that are adjacent to each other are disposed so as to be separated by an interval corresponding to $\lambda_\theta/4$ in terms of the center angle along a circumferential direction of the vibrating member. The piezoelectric elements are polarized in opposite directions in a thickness direction. The rotor is disposed so as to contact the stator, and is rotated by receiving vibration resulting from a 3n-wave traveling wave generated by the stator.

18 Claims, 9 Drawing Sheets

ULTRASONIC MOTOR

CROSS REFERENCE TO RELATED APPLICATIONS

The present application is a continuation of International Application No. PCT/JP2009/002182, filed May 18, 2009, which claims priority to Japanese Patent Application No. JP2008-138028, filed May 27, 2008, the entire contents of each of these applications being incorporated herein by reference in their entirety.

FIELD OF THE INVENTION

The present invention relates to an ultrasonic motor using a vibrating member whose outer circumferential edge is circular or polygonal. More specifically, the present invention relates to an ultrasonic motor including a stator in which a plurality of piezoelectric elements are disposed so as to be dispersed in the form of a ring.

BACKGROUND OF THE INVENTION

Hitherto, various ultrasonic motors making use of piezoelectric effects have been proposed. Patent Document 1 indicated below discusses an ultrasonic motor including a stator, formed by affixing a circular ring-shaped elastic member to a circular ring-shaped piezoelectric vibrator, and a rotor, which contacts the circular ring-shaped elastic member. In the circular ring-shaped piezoelectric vibrator, a plurality of electrodes are formed on both surfaces of a circular ring-shaped piezoelectric member formed of piezoelectric ceramics. The plurality of electrodes include a first phase electrode group and a second phase electrode group. By applying high-frequency voltages having different phases temporally to the first phase electrode group and the second phase electrode group, two standing waves are generated. By combining the two standing waves to each other, a traveling wave is generated at a surface of the ring-shaped elastic member and a surface of the ring-shaped piezoelectric vibrator.

In an ultrasonic motor using a circular ring-shaped piezoelectric vibrator such as that discussed in Patent Document 1, it is difficult to manufacture the piezoelectric vibrator. That is, in order to excite a predetermined vibration, the piezoelectric member must be precisely formed into a circular ring shape. Therefore, it is necessary to polish piezoelectric ceramics with high precision so that the center of an outer circumferential edge and the center of an inner circumferential edge of the circular ring-shaped piezoelectric member are the same. Further, processing must be separately performed in polarization and electrode formation, thereby tending to increase costs.

In the ultrasonic motor discussed in Patent Document 1, since one surface of the circular ring-shaped elastic member is entirely covered by the circular ring-shaped piezoelectric vibrator, it is necessary to contact an opposite side of the circular ring-shaped elastic member with a rotor. That is, the surface that contacts the rotor is limited to one surface of the ring-shaped elastic member. Therefore, there are large design limitations.

Figure 12:
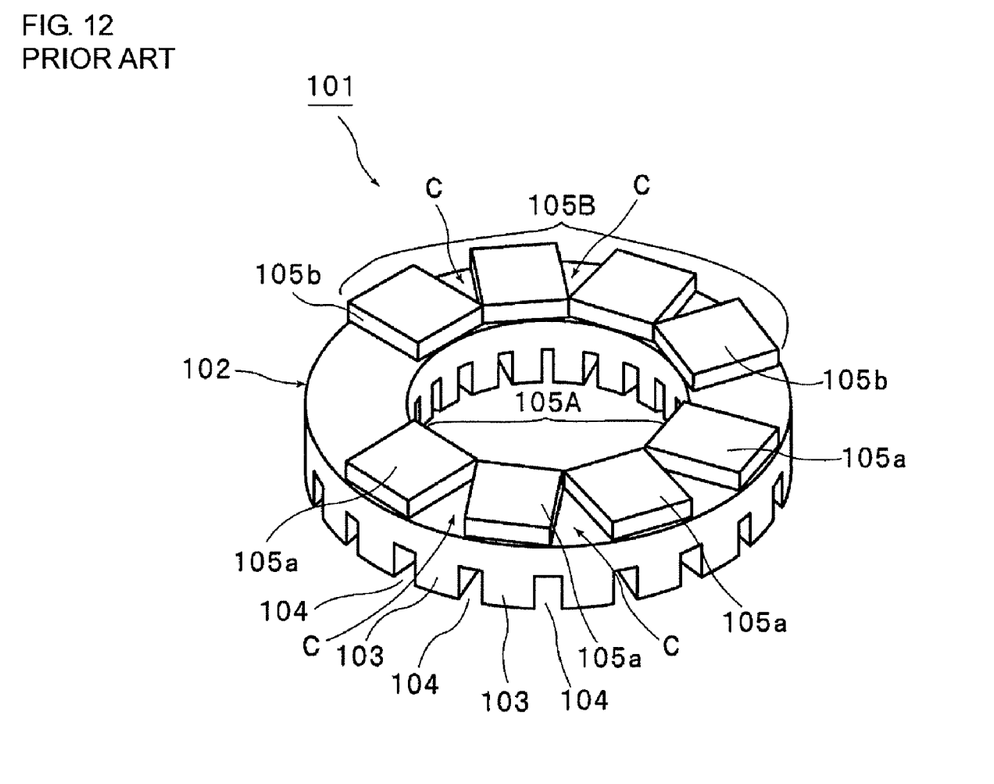
FIG. 12 is a schematic perspective view for illustrating a related ultrasonic motor.

On the other hand, Patent Document 2 indicated below discusses an ultrasonic motor including a stator shown in FIG. 12. In the stator 101 shown in FIG. 12, a circular ring-shaped elastic member 102 formed of, for example, metal is used. A plurality of projections 103 are formed at the lower surface of the elastic member 102 so as to be disposed in a dispersed manner in a circumferential direction. The plurality of protrusions 103 are provided by forming a plurality of slits 104 extending in a radial direction.

A plurality of first piezoelectric elements 105a and a plurality of second piezoelectric elements 102b are affixed to the upper surface of the circular ring-shaped elastic member 102. More specifically, an A-phase driving section 105A, including a portion in which four first piezoelectric elements 105a are disposed, and a B-phase driving section 105B, including a portion in which four second piezoelectric elements 105b are disposed, are provided. At the A-phase driving section and the B-phase driving section, standing waves whose phases differ from each other are temporally excited. By combining these standing waves, a traveling wave is formed. When the wavelength of the traveling wave is represented by $\lambda$, the A-phase driving section 105A and the B-phase driving section 105B are disposed at a $3\lambda/4$ interval at one side and at a $\lambda/4$ interval at the other side.

In manufacturing the ultrasonic motor discussed in Patent Document 2, the plurality of piezoelectric elements 105a and 105b having rectangular planar shapes are affixed to the upper surface of the circular ring-shaped elastic member 102 that is formed of, for example, metal and that is easily processed. Therefore, it is not necessary to perform complicated processings of piezoelectric ceramics.

[Patent Document 1] Japanese Examined Patent Application Publication No. 1-17354

[Patent Document 2] Japanese Unexamined Patent Application Publication No. 11-187677

In each of the A-phase driving section and the B-phase driving section, a standing-wave 5-wave whose wave number is 5 is excited. In the specification, when the wave number of the standing wave that propagates through a ring-shaped portion in a circumferential direction is S (S is a natural number), the wave is called an S wave. In order to efficiently excite each of these S harmonic waves, it is desirable that a circumferential length of an area where excitation occurs at one piezoelectric element 105a or one piezoelectric element 105b, that is, the size along a propagation path of a traveling wave be $\lambda/2$, and that the entire area of the portion corresponding to the circumferential length $\lambda/2$ be excited.

However, in the ultrasonic motor discussed in Patent Document 2, gaps indicated by arrows C are formed between the rectangular piezoelectric elements 105a that are adjacent to each other and the rectangular piezoelectric elements 125a that are adjacent to each other. Therefore, excitation efficiency cannot be increased.

In the ultrasonic motor discussed in Patent Document 2, in order to reduce the gaps C, the plurality of piezoelectric elements 105a and 105b may have the shape of a fan or a trapezoidal shape. However, in this case, the piezoelectric elements cannot be efficiently formed at a low cost, thereby increasing costs.

In addition, in the ultrasonic motor, a holding structure of the stator 101 tends to be complicated. In the stator 101, the plurality of piezoelectric elements 105a and 105b are provided at the upper surface side of the circular ring-shaped piezoelectric member 102, and the rotor is made to contact the projections 103 at the lower surface side to perform a driving operation. Therefore, in order to hold the stator 101, it is necessary to connect one end of a connection portion to a side surface of the circular ring-shaped elastic member 102, and to connect the other end of the connection portion to a holding portion. Therefore, the holding structure including, for example, the connection portion tends to be complicated.

In addition, in the ultrasonic motor, the rotor must be brought into contact with a surface of the elastic member 102 at a side opposite to the side where the piezoelectric elements 105a and 105b are placed. Therefore, the surface that contacts the rotor is limited to one surface of the elastic member 102.

SUMMARY OF THE INVENTION

It is an object of the present invention to overcome the problems of the aforementioned related arts, and to provide an ultrasonic motor which is easy to manufacture, which has high efficiency, which makes it possible to simplify a holding structure, and which has few restrictions at a portion that drives a rotor.

According to a broad aspect of the present invention, there is provided an ultrasonic motor comprising a stator and a rotor. The stator includes a vibrating member formed of a plate member whose outer circumferential edge is circular or polygonal; and 4n piezoelectric elements that are secured to one surface of the vibrating member for generating a traveling wave of a 3n wave (n is a natural number) traveling in a circulating manner by vibrating the vibrating member, the 4n piezoelectric elements being disposed so as to be dispersed in a circumferential direction, which is a direction in which the traveling wave circulates. If a center angle around the center in the circumferential direction and corresponding to a wavelength of the traveling wave is $\lambda_\theta$, each piezoelectric element has a size corresponding to $\lambda_\theta/2$ in terms of the center angle, and the piezoelectric elements that are adjacent to each other are disposed so as to be separated from each other by an interval corresponding to $\lambda_\theta/4$ in terms of the center angle along the circumferential direction. Each piezoelectric element includes a piezoelectric member and a pair of electrodes formed at respective surfaces of the piezoelectric member. The 4n piezoelectric elements are such that the piezoelectric member of each piezoelectric element is polarized in the same direction in thickness directions as the piezoelectric member of the piezoelectric element that is adjacent thereto at one side in the circumferential direction and such that the piezoelectric member of each piezoelectric element is polarized in an opposite direction in the thickness directions to the piezoelectric member of the piezoelectric element that is adjacent thereto at the other side in the circumferential direction. The rotor is disposed so as to be in contact with the stator, and is rotated by receiving vibration resulting from the 3n-wave traveling wave generated by the stator.

According to another broad aspect of the present invention, there is provided an ultrasonic motor comprising a stator and a rotor. The stator includes a vibrating member formed of a plate member whose outer circumferential edge is circular or polygonal; and 4n piezoelectric elements (n is a natural number) that are secured to one surface of the vibrating member for generating a traveling wave of a $(2k+1)n$ wave (k, n are each a natural number) traveling in a circulating manner by vibrating the vibrating member, the 4n piezoelectric elements being disposed so as to be dispersed in a circumferential direction, which is a direction in which the traveling wave of the vibrating member circulates. Each piezoelectric element includes a piezoelectric member and a pair of electrodes formed at respective surfaces of the piezoelectric member. The piezoelectric member of each piezoelectric element has a k number of polarization areas provided side by side in the circumferential direction. If a center angle around the center in the circumferential direction and corresponding to a wavelength of the traveling wave that is generated is $\lambda_\theta$, each polarization area has a size corresponding to $\lambda_\theta/2$ in terms of the center angle, and the piezoelectric elements that are adjacent to each other are disposed so as to be separated from each other by an interval corresponding to $\lambda_\theta/4$ in terms of the center angle. The polarization areas that are adjacent to each other are polarized in opposite directions in thickness directions. In the 4n piezoelectric elements, polarization directions of the k number of polarization areas of each piezoelectric element are such that the polarization direction of the k number of polarization areas of each piezoelectric element is in the same direction as the polarization direction of the k number of polarization areas of the piezoelectric element adjacent thereto at one side in the circumferential direction and such that the polarization direction of the k number of polarization areas of each piezoelectric element is in an opposite direction to the polarization direction of the k number of polarization areas of the piezoelectric element adjacent thereto at the other side. The $(2k+1)n$ wave traveling wave is generated. The rotor contacts the stator, and is rotated by receiving vibration resulting from the traveling wave generated by the stator.

In the ultrasonic motor according to the present invention, it is desirable that the plurality of piezoelectric elements be disposed point-symmetrically with respect to the center of the one surface of the vibrating member. In this case, even if stator manufacturing variations occur or a pressing state of the rotor is in an unbalanced state, the ultrasonic motor is not easily affected by these. Therefore, it is possible to increase the stability of the operation of the ultrasonic motor.

The shapes of the piezoelectric elements are not particularly limited. In a different specific aspect of the present invention, each piezoelectric element has a rectangular planar shape. The piezoelectric elements having rectangular planar shapes can be easily manufactured and make it possible to reduce costs. If each piezoelectric elements has a rectangular planar shape, it is desirable that, in each rectangular shape, the distance between the center point of the third side and the center point of the fourth side corresponds to $\lambda_\theta/2$ in terms of the center angle. Therefore, rectangular piezoelectric elements whose long sides have lengths corresponding to the center angle of $\lambda_\theta/2$ only need to be provided, thereby making it possible to simplify a manufacturing process.

An ultrasonic motor according to still a different specific aspect of the present invention further comprises a holding member that holds the vibrating member. By connecting the holding member to another portion, it is possible to drive the ultrasonic motor with high efficiency.

Although the holding member is not particularly limited, it is desirable that the holding member be connected to a first surface of the vibrating member, and a second surface side of the vibrating member that is opposite to the first surface correspond to a portion where the vibrating member contacts the rotor. Therefore, since the holding member can be easily connected to one surface of the vibrating member, it is possible to simplify a holding structure. In this case, the rotor can be driven using an opposite surface of the vibrating member. Consequently, since extra space is not required at a side of the vibrating member, it is possible to reduce a setting space of the ultrasonic motor.

An ultrasonic motor according to still another specific aspect of the present invention further comprises a contactor provided at the surface of the vibrating member at the side where the vibrating member contacts the rotor so as to protrude from the surface of the vibrating member. This makes it possible to more efficiently rotationally drive the rotor.

In the ultrasonic motor according to the present invention, since the stator has a structure in which 4n piezoelectric elements are joined to the vibrating member, it is not necessary to provide ring-shaped piezoelectric members, thereby making it unnecessary to perform a complicated piezoelectric member processing step.

In addition, when the center angle corresponding to the length of the wavelength of a traveling wave that is generated is $\lambda_\theta$, the piezoelectric elements of the 4n piezoelectric elements have sizes corresponding to the center angle of $\lambda_\theta/2$, and the piezoelectric elements that are adjacent to each other are disposed so as to be separated from each other by an interval corresponding to the center angle of $\lambda_\theta/4$ in the circumferential direction. Therefore, it is possible to efficiently generate a traveling wave of a 3n wave or a (2k+1)n wave. Consequently, it is possible to increase the efficiency of the ultrasonic motor.

Further, since a member that contacts the rotor can also be provided at an area where the aforementioned interval of $\lambda_\theta/4$ is provided, it is possible to use either one of the surfaces of the vibrating member as a surface that drives the rotor.

Further, since the vibrating member can be mechanically held using the surface of the vibrating member at a side opposite to the surface to which the piezoelectric elements are joined, it is possible to simplify the holding structure.

DETAILED DESCRIPTION OF THE INVENTION

The present invention will hereunder be clarified by illustrating specific embodiments of the present invention with reference to the drawings.

Figures 4A, 4B:
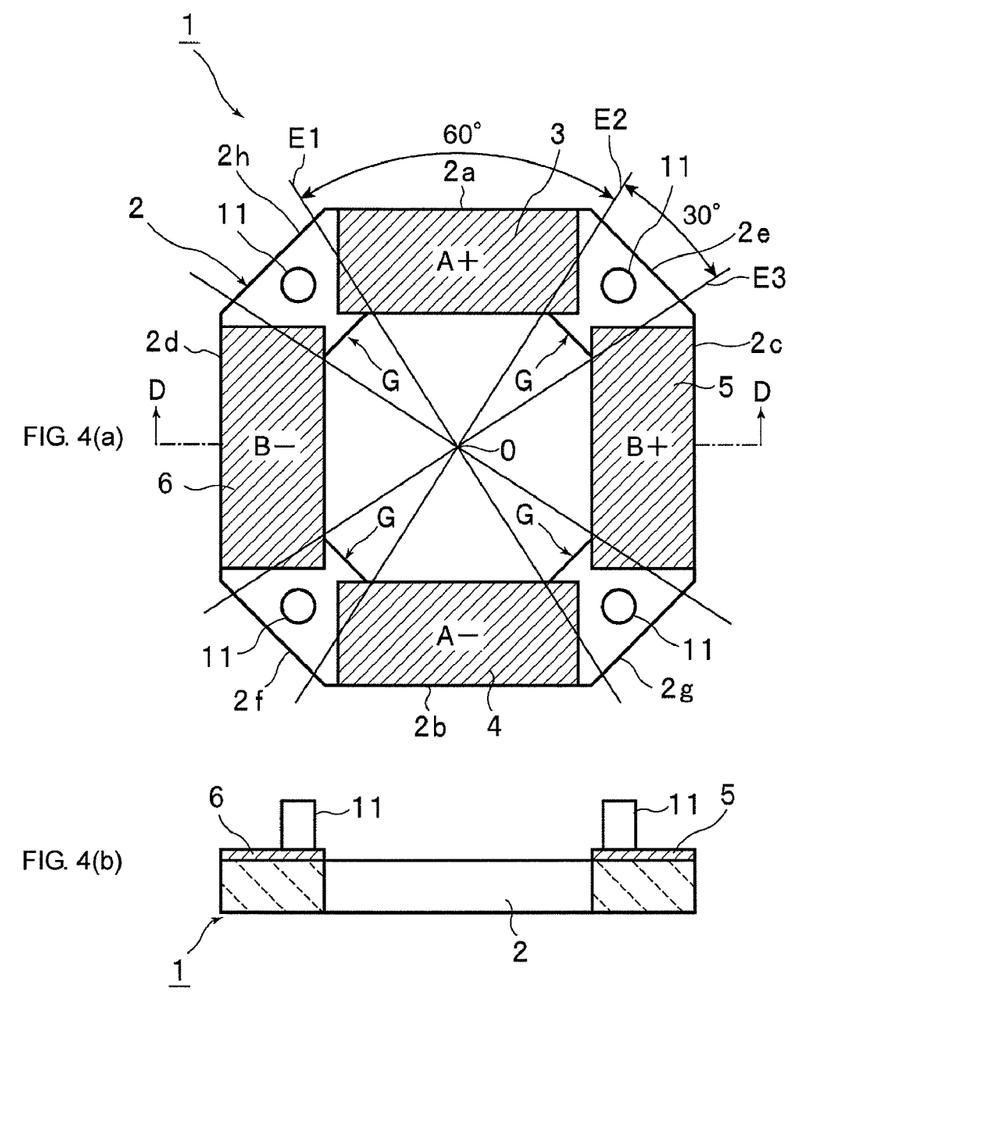
FIGS. 4(a) and 4(b) are views for illustrating an ultrasonic motor according to a first embodiment of the present invention, with FIG. 4(a) being a plan view of a stator and FIG. 4(b) being a sectional view taken along line D-D in FIG. 4(a).
Figure 5A:
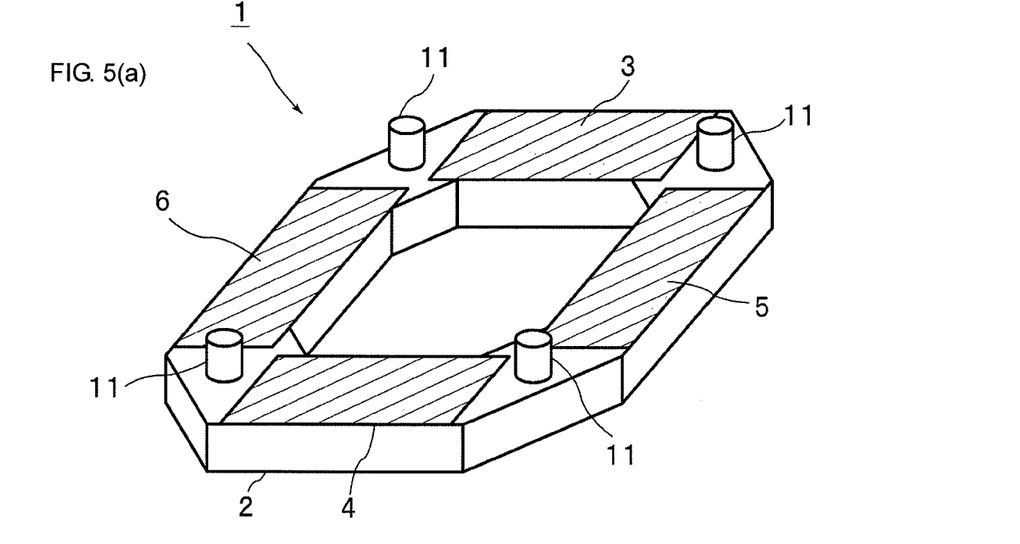
FIG. 5(a) is an external perspective view of the stator shown in FIG. 4.

FIG. 4(a) and FIG. 4(b) are, respectively, a plan view of a stator of an ultrasonic motor according to a first embodiment and a sectional view taken along line D-D in FIG. 4(a). FIG. 5(a) is an external perspective view of the stator.

The ultrasonic motor according to the embodiment includes the stator 1 shown in FIGS. 4 and 5(a). The stator 1 includes a ring-shaped vibrating member 2 formed of an elastic member. In the embodiment, the ring-shaped vibrating member 2 is formed of phosphor bronze. However, the vibrating member 2 need not be necessarily formed of a metal, such as phosphor bronze. The vibrating member 2 may be formed of other elastic materials, such as synthetic resin, silicon material, or ceramics. The vibrating member 2 can be easily formed into a precise shape by, for example, a punching operation.

The term "ring-shaped" widely refers to various shapes having an opening at the center, such as a circular ring shape and an angular ring shape.

In the embodiment, an outer circumferential edge of the vibrating member 2 has an octagonal shape. An inner circumferential edge thereof also has an octagonal shape that is concentric with the octagonal shape of the outer circumferential edge. The vibrating member 2 is diagrammatically symmetrical about a center point O. A widthwise size of the vibrating member 2 is constant in a circumferential direction described later. Here, the widthwise size refers to a distance between the inner circumferential edge and the outer circumferential edge of the vibrating member 2.

As shown in FIG. 4(a), the outer circumferential edge of the vibrating member 2 is provided with a first long side 2a and a second long side 2b that face each other, a third long side 2c and a fourth long side 2d that face each other, and first to four short sides 2e to 2h extending obliquely in FIG. 4(a).

Rectangular planar first to fourth piezoelectric elements 3 to 6 are placed on one side of the vibrating member 2, and are affixed thereto with an adhesive (not shown). The long sides of the rectangular piezoelectric elements 3 to 6 are provided along the first to fourth long sides 2a to 2d.

Figure 5B:
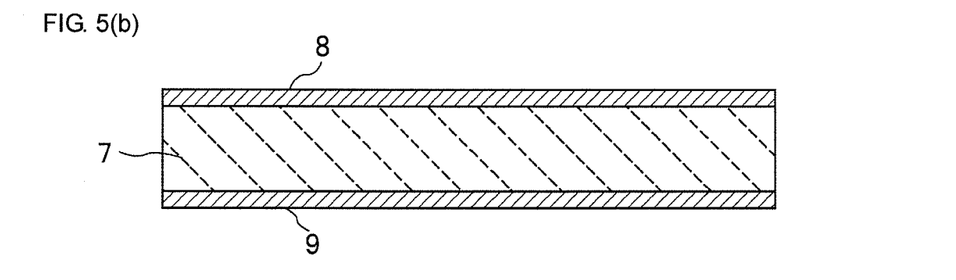
FIG. 5(b) is a sectional view of the piezoelectric element.

As shown in FIG. 5(b) showing the piezoelectric element 3 as representing the other piezoelectric elements, the piezoelectric element 3 includes a piezoelectric member 7 and a pair of electrodes 8 and 9, one electrode being formed on each surface of the piezoelectric member 7. The piezoelectric member 7 is formed of lead zirconate titanate piezoelectric ceramics. The material of the piezoelectric member 7 is not limited to lead zirconate titanate piezoelectric ceramics. It may be other piezoelectric materials, such as polyvinylidene fluoride or aluminum nitride. The piezoelectric member is polarized in a thickness direction.

The electrodes 8 and 9 are formed of an appropriate metallic material, such as Al, Cu, Ag, or an Ag—Pd alloy.

The piezoelectric members of the first piezoelectric element 3 and the second piezoelectric element 4 that face each other are polarized in opposite directions in thickness directions. Similarly, the piezoelectric members of the third piezoelectric element 5 and the fourth piezoelectric element 6 that face each other are also polarized in opposite directions in thickness directions.

Among the piezoelectric elements 3 to 6, the first piezoelectric element 3 and the second piezoelectric element 4 that face each other are piezoelectric elements for constituting an A phase driving section; and the third piezoelectric element 5 and the fourth piezoelectric element 6 are piezoelectric elements for constituting a B phase driving section. In the A phase driving section, the piezoelectric elements are labeled A+ and A−, respectively. The piezoelectric elements constituting the B phase driving section are represented by B+ and B−, respectively. "A+ and A−" indicate that the piezoelectric members are polarized in opposite directions in the thickness directions. This also similarly applies to the B phase driving section.

The aforementioned first to fourth piezoelectric elements 3 to 6 have rectangular planar shapes. Therefore, they can be efficiently manufactured at a low cost. However, in the present invention, the piezoelectric elements 3 to 6 may have other planar shapes, such as fan shapes, in addition to rectangular planar shapes. The piezoelectric elements 3 to 6 have the same planar shape. Of the piezoelectric elements 3 to 6, the piezoelectric element 3 will be described as representing the other piezoelectric elements.

A virtual line connecting the center point of a first short side of the piezoelectric element 3 and a center O to each other and a virtual line connecting the center point of a second short side of the piezoelectric element 3 and the center O to each other are represented as virtual lines E1 and E2, respectively. An angle formed by the virtual lines E1 and E2, that is, a center angle is 60°. In other words, a distance L between the center points of the first and second short sides of the piezoelectric element 3 corresponds to the center angle of 60°. In the embodiment, 3-wave standing waves are excited and combined with each other to obtain a 3-wave traveling wave. If the center angle corresponding to the wavelength of the 3-wave traveling wave is $\lambda_\theta$, the distance L corresponds to a center angle of $\lambda_\theta/2$. The first to fourth piezoelectric elements 4 to 6 also have the same size.

The size of each piezoelectric element is determined by the center angle because the size of each piezoelectric element varies due to a radial distance from the center. That is, since the distance between the virtual lines E1 and E2 is changed by a radial position, the size of each piezoelectric element is expressed with the center angle as a reference.

In the specification, "circumferential direction" refers to a direction in which two standing waves generated by the vibrating member and a traveling wave generated by combining the two standing waves circulate. The center used to define the center angle is one around which the traveling wave circulates. This point will be described in more detail later with reference to FIG. 1.

The interval between the piezoelectric elements that are adjacent to each other, that is, the size along the circumferential direction corresponds to 30° in terms of the center angle. For example, the interval between the virtual line E2 shown in FIG. 4(a) and a virtual line E3 connecting a center point at a piezoelectric-element-3 side of the piezoelectric element 5 adjacent to the piezoelectric element 3 to the center point O is $\lambda_\theta/4=30°$ in terms of the center angle.

Therefore, the piezoelectric elements 3 and 5 that are adjacent to each other are separated by the interval of $\lambda_\theta/4$ in terms of the center angle in the circumferential direction.

In the embodiment, since the vibrating member has an octagonal shape, external sizes at areas where the short sides 2e to 2h are positioned are small. That is, the octagonal shape corresponds to a shape in which four corners of a square shape are chamfered. Therefore, compared to the external sizes of the square shape, the external sizes of the octagonal shape are smaller, thereby making it possible to realize size reduction. At the chamfered portions, inward extension is performed as indicated by arrow G so that the width of the ring-shaped vibrating member becomes the same as those of other portions.

However, when there are no restrictions on the external shapes, chamfering is not required. Therefore, the outer circumferential shape and the inner circumferential shape may each be a square shape.

It is desirable that the ring-shaped vibrating member have a shape that is point symmetrical with respect to the center C. This makes it possible to reliably generate a traveling wave that travels around the center O. In addition, variations in driving force do not occur easily. Therefore, even if manufacturing variations of the stator that is assembled occur, or a press-contact force on the rotor is in an unbalanced state, the vibrating member is not easily affected by these. The point symmetrical shape that is symmetrical with respect to the center O is not particularly limited. That is, the external shape of the vibrating member may be various point symmetrical shapes that are symmetrical with respect to the center O. For the ring-shaped vibrating member, it is desirable that the shape of the inner circumferential edge be also similarly point symmetrical with respect to the center O.

Desirably, as in the embodiment, the ring-shaped vibrating member is such that its widthwise size is constant in the circumferential direction thereof, thereby making it possible to generate a traveling wave with high efficiency.

In the embodiment, the electrodes 8 at the lower surface sides of the respective piezoelectric elements 3 to 6, that is, the electrodes 8 at sides contacting the vibrating member 2 are connected to ground potential. For example, a lead wire or the like is connected between the opposite electrodes 9 and the electrodes 8 to apply high-frequency voltage as driving voltage. Instead of a lead wire, a flexible electrical connection member such as a flexible substrate may be press-bonded to the electrodes at the respective surfaces.

As shown in FIG. 5(a), contactors 11 serving as a displacement enlarging structure and projecting upwards are provided so as to be separated from each other between the piezoelectric elements 3 to 6 that are adjacent to each other on the vibrating member 2. Although, in the embodiment, the contactors 11 have a circular cylindrical shape, they may have a prismatic shape.

Figure 6:
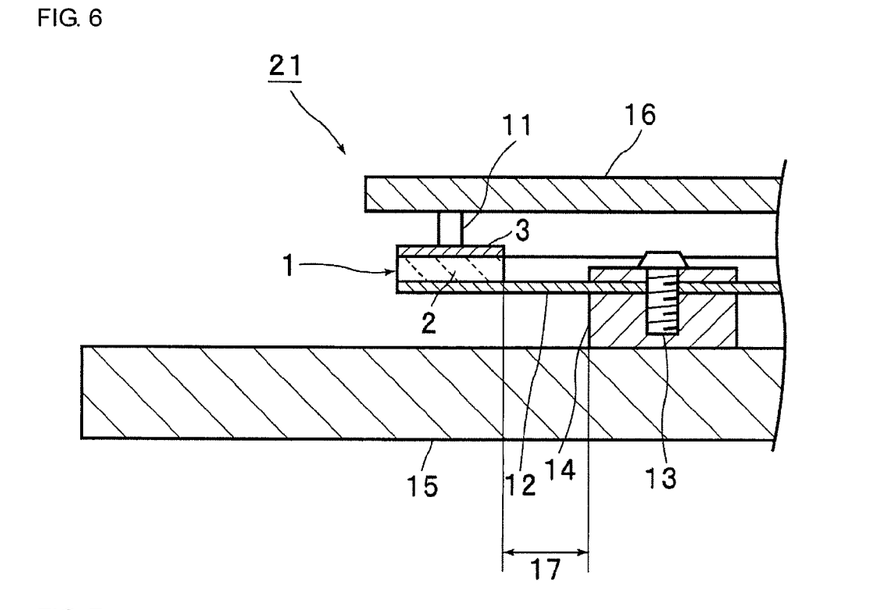
FIG. 6 is a partial cutaway front sectional view for illustrating the ultrasonic motor using the stator shown in FIGS. 4 and 5.
Figure 8:
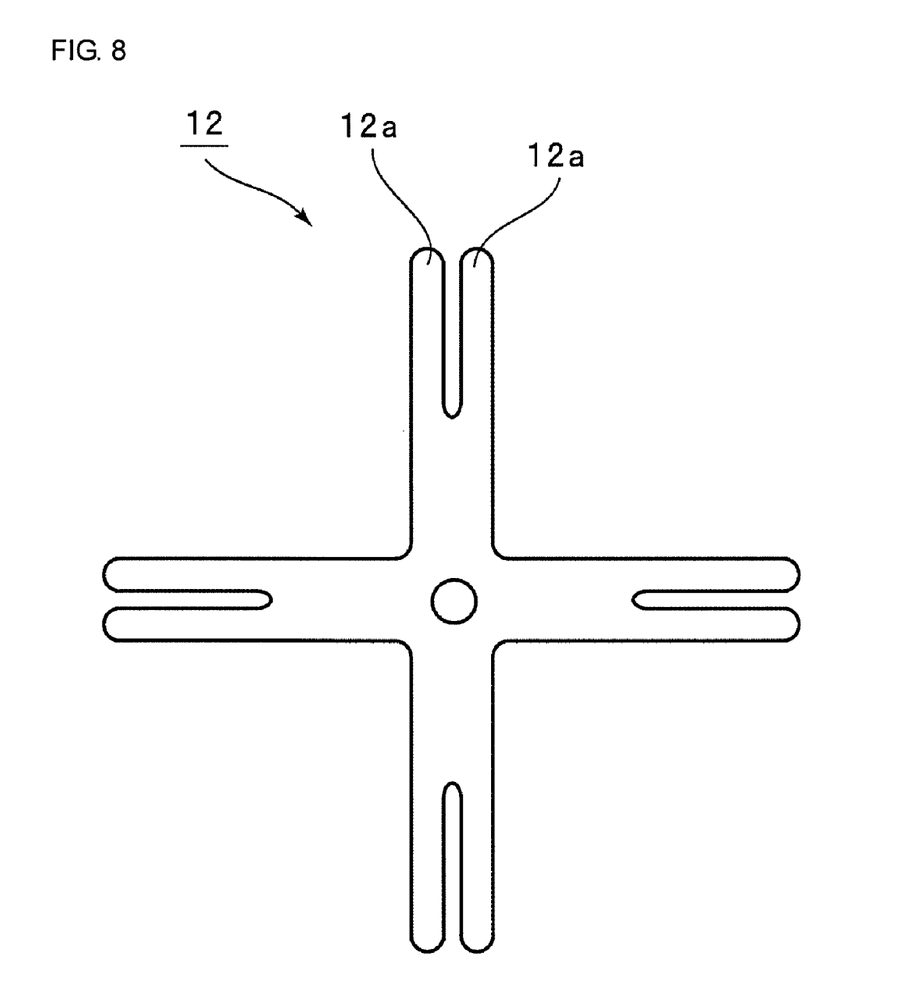
FIG. 8 is a schematic plan view of a holding plate used in the ultrasonic motor according to the first embodiment.

As shown in FIG. 6, in the ultrasonic motor according to the embodiment, the stator 1 is secured to the upper surface of a holding plate 12. FIG. 8 is a plan view of the holding plate 12. The holding plate 12 has a plurality of holding portions 12a extending outward from the center. Since gaps are provided between the respective holding portions 12a, the stator 1 can be held on the holding plate 12 so as not to interfere with excitation at the piezoelectric elements 3 to 6 of the stator 1. Returning to FIG. 6, using a bolt 13, the center side of the holding plate 12 is secured to a holding member 14 with a gap 17 that does not interfere with this vibration being provided. The holding member 14 is secured to the upper surface of a base plate 15.

A rotor 16 is disposed above the upper surface of the stator 1 so as to face the stator 1. The lower surface of the rotor 16 press-contacts the upper ends of the contactors 11.

Figure 7:
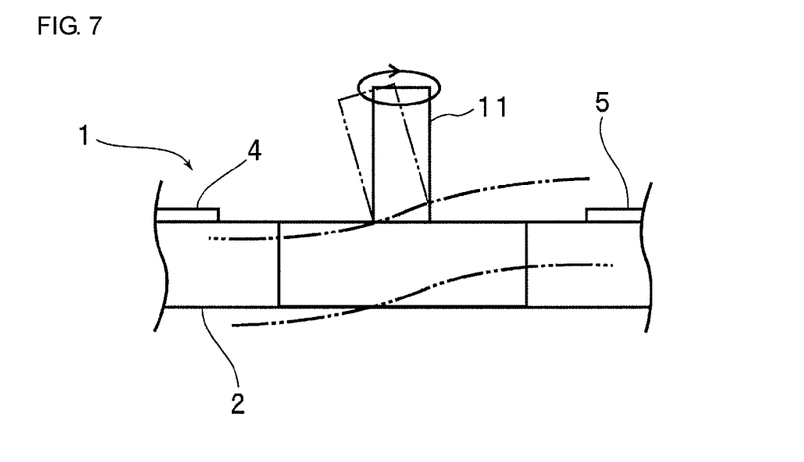
FIG. 7 is a partial cutaway front sectional view for illustrating a function of a contactor serving as a displacement enlarging mechanism in the ultrasonic motor according to the first embodiment.

When a traveling wave is generated at the ring-shaped vibrating member 2, formed of an elastic material, during driving, the contactors 11 are such that an end of each contactor moves elliptically as shown in FIG. 7. Therefore, the end of each contactor 11 is displaced by a larger amount than a displacement caused by the traveling wave generated at the vibrating member 2. Therefore, it is possible for the rotor 16 that press-contacts the end of each contactor 11 to be effectively rotationally driven and to obtain a high driving speed.

Each of the contactors 11 is formed of ceramics having excellent wear resistance, such as alumina; and is secured to the upper surface of the ring-shaped vibrating member 2 with, for example, an adhesive. However, each of the contactors 11 may be formed of synthetic resin or a metal instead of ceramics. The contactors 11 may be integrally formed using the same material as the vibrating member 2.

In this case, the vibrating member 2 and the contactors 11 may be simultaneously formed by cutting the material of the vibrating member 2. Alternatively, when the vibrating member 2 is formed of a metallic plate, the contactors 11 may be formed by hollow projections by mechanically processing a portion of the metallic plate.

During driving, high-frequency voltage having the same 3-wave resonance frequency is applied between the first and second piezoelectric elements 3 and 4. High-frequency voltage having a phase differing from that of the high-frequency voltage is applied to the third and fourth piezoelectric elements 5 and 6. In this case, driving voltages applied to the piezoelectric elements 3 and 4 or the piezoelectric elements 5 and 6 cause one 3-wave standing wave to be excited. Therefore, the piezoelectric elements 3 and 4 constituting the A-phase driving section cause an A-phase 3-wave standing wave to be excited, whereas the piezoelectric elements 5 and 6 disposed in a direction orthogonal to a direction connecting the piezoelectric elements 3 and 4 cause a B-phase 3-wave standing wave to be excited. By providing a phase difference of ±90° between the A-phase driving voltage and the B-phase driving voltage, a traveling wave formed by combining these standing waves is obtained. In this case, it is possible to rotate forwardly or reversely the rotor 16 on the basis of the phase difference of +90° or −90°.

In the ultrasonic motor 21 according to the embodiment, the contactors 11 are formed on the same surface as where the piezoelectric elements 3 to 6 of the stator 1 are formed. Therefore, as shown in FIG. 6, it is possible to stably and easily hold the stator 1 using the lower surface, which is the opposite surface of the vibrating member 2. This makes it possible to simplify a holding structure. In addition, it becomes easy to route, for example, a ground wire by making use of the lower surface side of the vibrating member 2.

According to the embodiment, it is possible to easily manufacture the ring-shaped vibrating member 2 at a low cost, and the stator 1 is formed by only affixing the piezoelectric elements 3 to 6 to one surface of the vibrating member. Therefore, it is possible to simplify and reduce costs of the manufacturing process of the stator 1. In addition, it is possible to simplify the holding structure as mentioned above.

Figure 1:
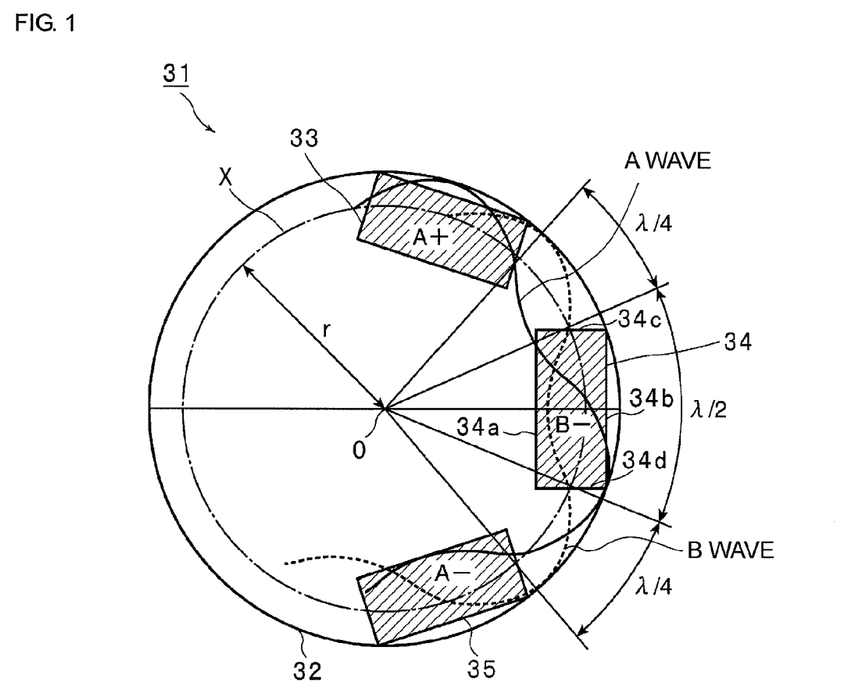
FIG. 1 is a schematic plan view for illustrating intervals between piezoelectric elements and lengths of the piezoelectric elements and standing waves excited in a stator for explaining the principle of the present invention.
Figure 2:
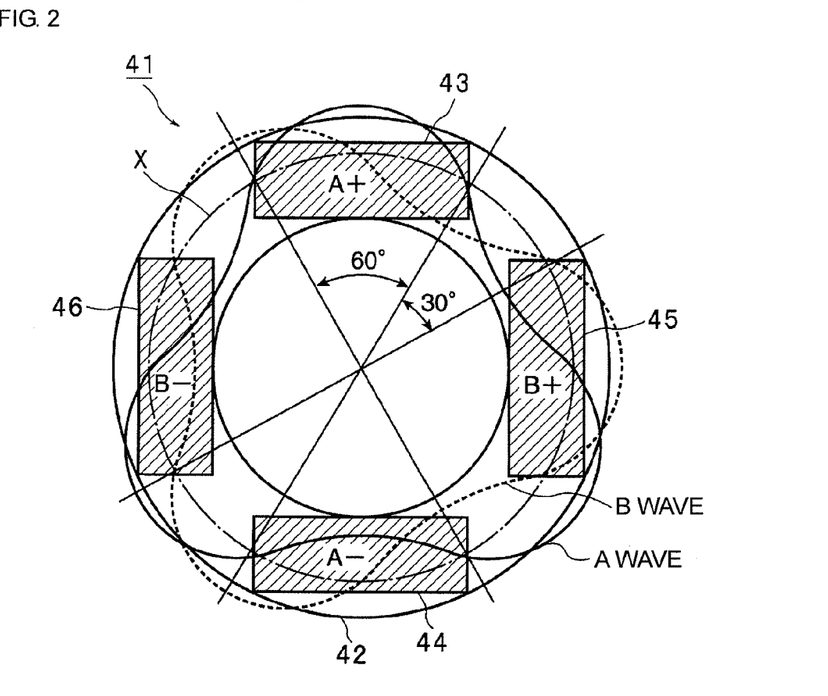
FIG. 2 is a schematic plan view for illustrating an exemplary structure that causes a 3-wave standing wave to be generated in a circular ring-shaped vibrating member.
Figure 3:
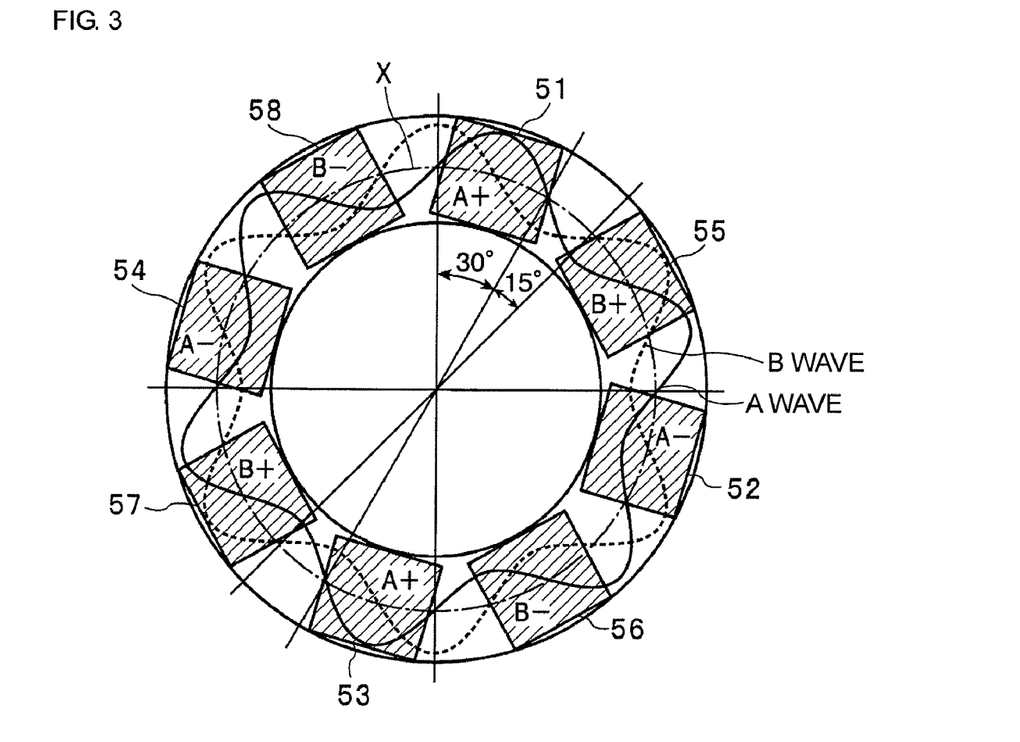
FIG. 3 is a schematic plan view for illustrating an exemplary structure for causing a 6-wave standing wave to be generated in a circular ring-shaped vibrating member.

As mentioned above, the piezoelectric elements 3 and 4 constituting the A-phase driving section and the piezoelectric elements 5 and 6 constituting the B-phase driving section have sizes in which the respective distances between the center points of the respective pairs of short sides correspond to the center angle of $\lambda_\theta/2$. Therefore, compared to the ultrasonic motor discussed in Patent Document 2, the efficiency can be effectively increased. With reference to FIGS. 1 to 3, the principle of the present invention will be further clarified.

In a stator 31 shown in FIG. 1, in order to simplify the description, a vibrating member 32 has a circular ring shape. The description is given using the circular ring-shaped vibrating member 32 because a standing wave (described later) is easily illustrated and the condition of generating the standing wave is easily understood.

As schematically shown in FIG. 1, in the circular ring-shaped vibrating member 32, a plurality of piezoelectric elements 33 to 35 are disposed so as to be separated from each other at the interval of $\lambda_\theta/4$. The aforementioned size of the piezoelectric elements 33 to 35 is $\lambda_\theta/2$ in terms of the center angle. An A wave or a B wave is excited along the entire length of the corresponding piezoelectric element. By such a structure, it is possible to obtain a stable traveling wave that travels along a circular ring-shaped propagation path indicated by a dashed line X. This will hereunder be described.

In FIG. 1, in the piezoelectric element 34, a first side 34*a* and a second side 34*b* correspond to a pair of long sides of a rectangle. The first side 34*a* is positioned towards a center O. A third side 34*c* and a fourth side 34*d* are short sides that connect the first side 34*a* and the second side 34*b* to each other. The aforementioned sizes of the piezoelectric elements correspond to the distance between the center points of the third side 34*c* and the fourth side 34*d* when the piezoelectric element 34 is taken as an example.

In order for each of the A wave and the B wave to be a standing wave, it is necessary for an integral multiple of $(\lambda_\theta/2+\lambda_\theta/4)$, which is the sum of the circumferential length of one piezoelectric element and the circumferential interval between the piezoelectric elements that are adjacent to each other, to be $2\pi$. Therefore, when n is a natural number and the size is expressed in terms of the center angle, $(\lambda_\theta/2+\lambda_\theta/4)\times n=2\pi$, and $n=4/3\,(2\pi/\lambda_\theta)$. If the wavelength is represented by m, $2\pi/\lambda_\theta=m$, so that the expression $n=(4/3)m$, which is Expression (1), is established.

From the aforementioned Expression (1), n is a natural number only when the wavelength m is a multiple of 3. Therefore, in the ring-shaped vibrating member, it is possible to excite, for example, a 3 wave in which the wave number is 3, a 6 wave in which the wave number is 6, and a 9 wave in which the wave number is 9. Therefore, it is understood that, in order to obtain a 3n wave, 4n piezoelectric elements having the aforementioned size corresponding to $\lambda_\theta/2$ in terms of the center angle are disposed so that the circumferential interval between the piezoelectric elements that are adjacent to each other is $\lambda_\theta/4$ in terms of the center angle. In addition, as long as the relationship of Expression (1) is satisfied, the vibrating member need not have a circular ring shape. As in the above-described embodiment, the external shape of the vibrating member may be an octagonal shape or other polygonal shapes. Further, it is understood that the vibrating member need not be ring-shaped, so that it may have the shape of a disc or a polygonal plate.

As mentioned above, since the plurality of piezoelectric elements only need to be affixed to one surface of the vibrating member formed of, for example, a metal, not only is it possible to reduce manufacturing costs, but also it is possible to perform excitation at an area along the entire length corresponding to the size of $\lambda_\theta/2$ in terms of the center angle at the portion to which each piezoelectric element is affixed.

Since the interval of $\lambda_\theta/4$ is provided between the piezoelectric elements that are adjacent to each other, it is possible to easily form a displacement enlarging mechanism such as the aforementioned contactors 11. A feedback sensor is easily mounted and, for example, wires are easily formed in the aforementioned interval. Therefore, it is possible to further size reduction.

In a stator 41 shown in FIG. 2, a pair of first and second piezoelectric elements 43 and 44, serving as an A-phase driving section, and a pair of third and fourth piezoelectric elements 45 and 46, serving as a B-phase driving section, are disposed on a circular ring-shaped vibrating member 42.

In FIG. 2, n=1, there are four piezoelectric elements, and the wave number of a wave that is excited is 3. Therefore, since $\lambda_\theta=360°/3=120°$, it is understood that the circumferential length of each of piezoelectric elements 33 to 36 is made to correspond to a center angle of 60°; and the piezoelectric elements 43 to 46 are disposed so that the interval between the piezoelectric elements that are adjacent to each other is 30° in terms of the center angle. An A wave and a B wave are as shown in FIG. 2.

A plurality of piezoelectric elements constituting an A phase are point-symmetrically disposed with respect to a center O; a plurality of piezoelectric elements constituting a B phase are similarly point-symmetrically disposed with respect to the center O; and, further, the A-phase driving section and the B-phase driving section are also point-symmetrically disposed with respect to the center O. Therefore, manufacturing variations of the vibrating member do not easily influence variations in A-phase and B-phase vibrations.

FIG. 3 shows an exemplary structure when a 6 wave is generated using a circular ring-shaped vibrating member. In this case, n=2 and eight piezoelectric elements 51 to 58 are affixed to one surface of the vibrating member. The wave number of the wave that is excited is 6, so that the 6 wave is excited. In this case, $\lambda_\theta=360°/6=60°$. Therefore, it is understood that the size of each of the piezoelectric elements 51 to 58 is 30° in terms of the center angle; and the piezoelectric elements 51 to 58 are disposed so that the interval between the piezoelectric elements is 15° in terms of the center angle.

In the case where n is greater than or equal to 3, similarly, it is possible to easily set the center angle corresponding to the size of each piezoelectric element and the center angle corresponding to the circumferential interval between the piezoelectric elements.

It is not necessary to form each piezoelectric element using a single piezoelectric member. It may be formed using a multilayer piezoelectric member in which a plurality of piezoelectric layers are stacked upon each other. In this case, driving can be performed at a lower voltage.

Figure 9A:
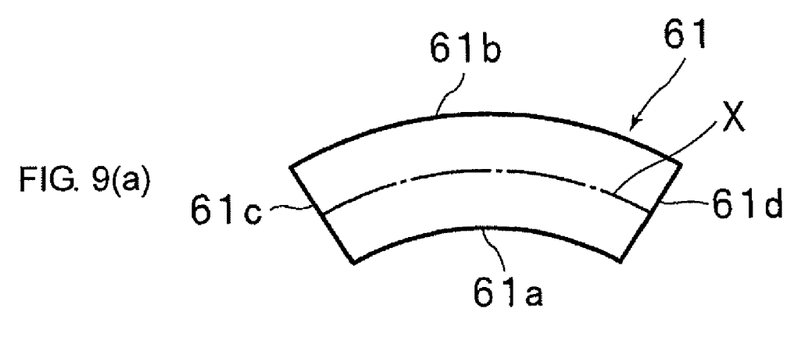
FIGS. 9(a) to 9(c) are plan views of modifications of planar shapes of a piezoelectric element.
Figure 9B:
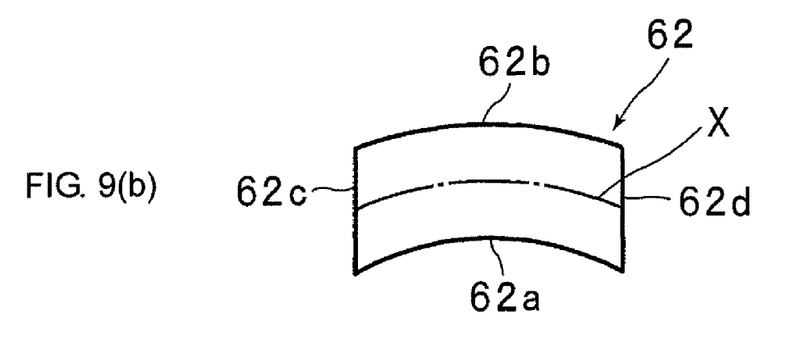
Figure 9C:
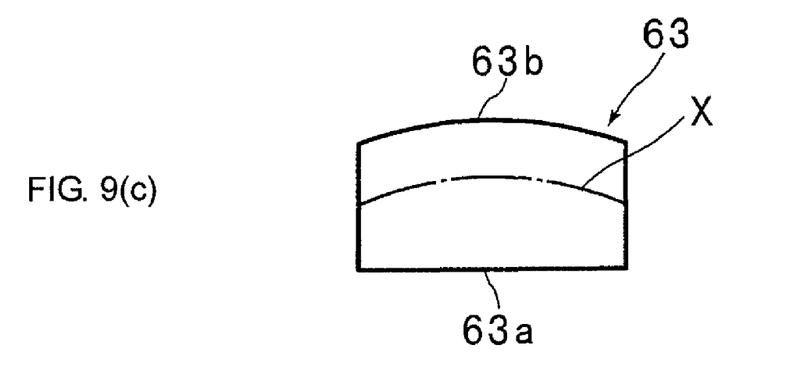

FIGS. 9(*a*) to 9(*c*) are schematic plan views of modifications of a planar shape of a piezoelectric element. In the embodiment, although the piezoelectric element has a rectangular planar shape, as shown in FIG. 9(*a*), the piezoelectric element may be one in which an inner first side 61*a* and an outer second side 61*b* each have an arch shape. Here, the first side 61*a* and the second side 61*b* are portions of circles that are concentric with a circular ring that generates a standing wave and that have diameters that are less than or greater than that of the circular ring. In this way, a piezoelectric element 61 in which the first side 61*a* and the second side 61*b* are curved so as to have, for example, an arch shape may be used. In FIG. 9(*a*), the first side 61*a* and the second side 61*b* each have an arch shape, and a third side 61*c* and a fourth side 61*d* are portions of straight lines extending radially with respect to a center O. In contrast, as with a piezoelectric element 62 shown in FIG. 9(*b*), the piezoelectric element may be one in which a first side 62*a* and a second side 62*b* each similarly have an arch shape, whereas a third side 62*c* and a fourth side 62*d* are portions of straight lines that do not pass through a center O.

In addition, as shown in FIG. 9(*c*), a piezoelectric element 63 in which a first side 63*a* has a linear shape and a second side 63*b* has a curved shape, such as an arch shape, may be used. A third side 63*c* and a fourth side 63*d* each have a linear shape. Even if any one of such piezoelectric elements 61, 62, or 63 is used, the distance between the center points of the third and fourth sides is $\lambda_\theta/2$ in terms of the center angle.

Figure 10:
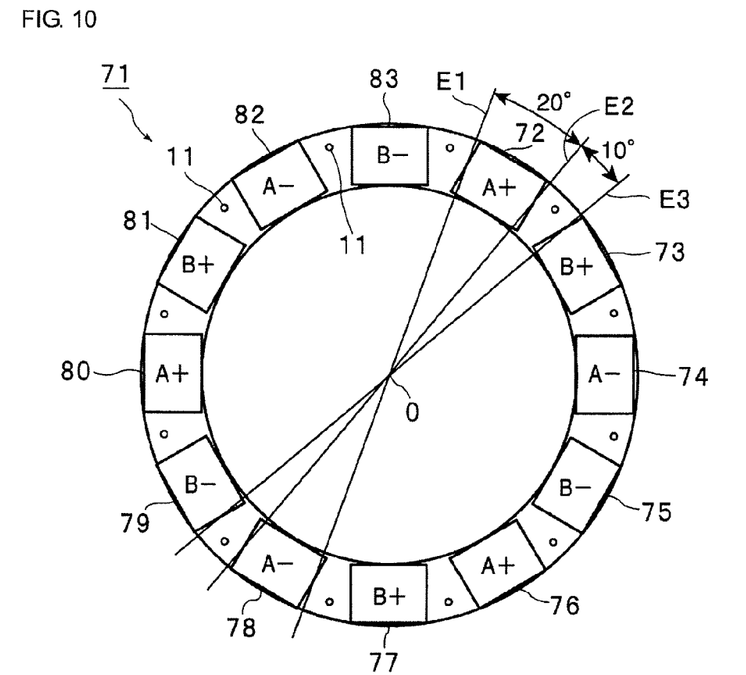
FIG. 10 is a schematic plan view of a stator of an ultrasonic motor according to a second embodiment.

FIG. 10 is a schematic plan view of a stator 71 of an ultrasonic motor according to a second embodiment of the present invention. In the second embodiment, 12 piezoelectric elements 72 to 83 having rectangular planar shapes are affixed to the upper surface of the circular ring-shaped stator 71. Here, since $\lambda_\theta=360°/9=40°$, each of the piezoelectric elements 72 to 83 has a size corresponding to $\lambda_\theta/2=20°$ in terms of the center angle. That is, taking the piezoelectric element 73 as an example, the center angle between virtual lines E1 and E2 passing through the center points of respective short sides and extending towards a center O is 20°. This is obtained by (360°/9)/2=20° as it is obtained in the aforementioned Expression (1). In addition, the interval between the piezoelectric elements that are adjacent to each other is $\lambda_\theta/4=10°$ in terms of the center angle.

As shown in FIG. 10, the 12 piezoelectric elements 72 to 83 are alternately used as piezoelectric elements that constitute an A-phase driving section or a B-phase driving section. In FIG. 10, for the A-phase driving section, the piezoelectric elements are labeled A+ or A−, and each piezoelectric element constituting the B-phase driving section is labeled B+ or B−.

That is, the piezoelectric elements 72, 74, 76, 78, 80, and 82 constitute the A-phase driving section. Among these, the piezoelectric elements 72, 76, and 80 are represented by A+, and the piezoelectric elements 74, 78, and 82 are represented by A−. "A+ and A−" refer to polarizations in opposite directions in the thickness directions. The B-phase driving section is similarly constructed. Therefore, by applying driving voltages having a phase difference of ±90° to the A-phase driving section and the B-phase driving section, it is possible to excite 9-wave standing waves whose wave number is 9. By a composite wave formed by combining an A-phase 9-wave standing wave and a B-phase 9-wave standing wave, a 9-wave traveling wave is obtained.

Figure 11:
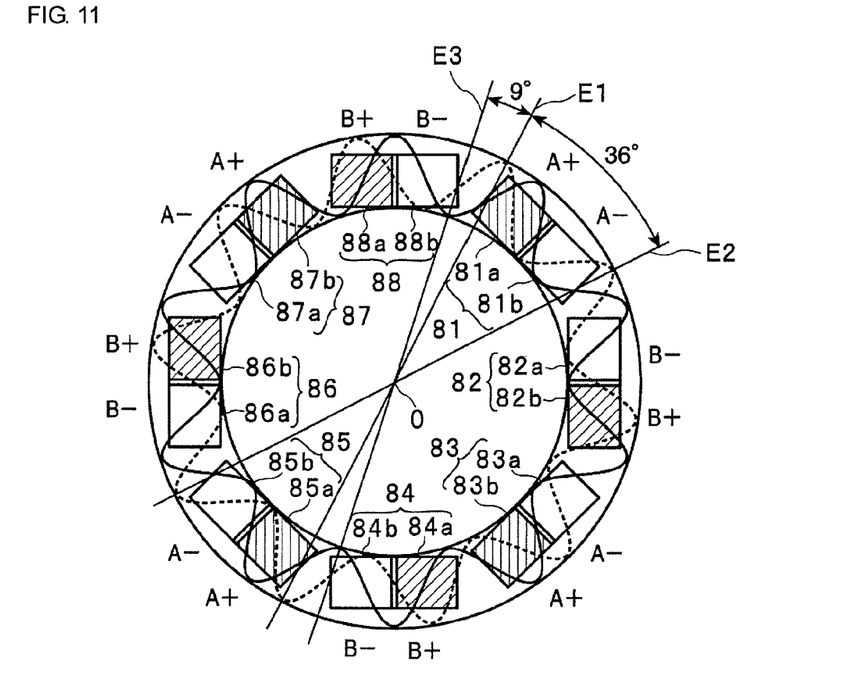
FIG. 11 is a schematic plan view of a stator of an ultrasonic motor according to a third embodiment.

FIG. 11 is a schematic plan view of a stator of an ultrasonic motor according to a third embodiment of the present invention.

In the first and second embodiments, the piezoelectric elements each have a size corresponding to $\lambda_\theta/2$ in terms of the center angle, and the piezoelectric elements that are adjacent to each other are disposed at an interval of $\lambda_\theta/4$ in terms of the center angle. However, it is possible to use a structure in which one piezoelectric element disposed so as to be separated by an interval of $\lambda_\theta/4$ is divided so as to correspond to an integral multiple of the center angle of $\lambda_\theta/2$. That is, in the one piezoelectric element 1 according to the first and second embodiments, at least one of the electrodes formed on the respective surfaces of the piezoelectric member may be divided. Here, the piezoelectric element is divided into a plurality of piezoelectric element portions, polarization directions of the piezoelectric element portions that are adjacent to each other are set in opposite directions, and the piezoelectric element has a size corresponding to an integral multiple of $\lambda_\theta/2$ in terms of the center angle. In other words, in the one piezoelectric element, the plurality of piezoelectric element portions may be disposed without substantially providing an interval therebetween. Here, in the plurality of piezoelectric elements, in a circumferential direction, the polarization directions are alternately in opposite directions, and the one piezoelectric element including the plurality of piezoelectric element portions has a size corresponding to an integral multiple of $\lambda_\theta/2$ in terms of the center angle.

When the one piezoelectric element is divided into a k number of piezoelectric element portions (where k is a natural number), $(k\cdot\lambda_\theta+2\cdot4)n=2\pi$. Therefore, the wave number $m=2\pi/\lambda_\theta$, so that $n=4/(2k+1)m$, which is Expression (2), is established. Consequently, it is possible to excite a traveling wave of a (2k+1)n wave using 4n piezoelectric members. FIG. 11 shows the embodiment in which k=2 and n=2. Since (2k+1)n=10, a 10-wave traveling wave is formed by eight piezoelectric elements (4n=4×2=8) each of which is divided in two. That is, the piezoelectric elements 81 to 88 include first and second divided piezoelectric element portions 81*a* and 81*b* to 88*a* and 88*b*. Each of the piezoelectric element portions is polarized in a + direction or a − direction as indicated by A+, A−, B−, or B+ in FIG. 11. The + direction or the − direction indicates polarization in one direction or in the other direction among the thickness directions of the piezoelectric member. "A+ and A−" indicate the piezoelectric element portions constituting the A-phase driving section; whereas "B+ and B−" indicate the piezoelectric element portions constituting the B-phase driving section.

Here, since $\lambda_\theta$ is 360°/10=360° in terms of the center angle, $\lambda_\theta/2=18°$. Therefore, one piezoelectric element has a size of 18° in terms of the center angle, and, as shown in FIG. 11, one piezoelectric element including the first and second piezoelectric element portions has a size of 36° in terms of the center angle. $\lambda_\theta/4=9°$. Therefore, the interval between the piezoelectric elements that are adjacent to each other is 9° in terms of the center angle.

In the embodiment, by performing a driving operation by providing a phase difference of ±90° between a voltage that drives the A phase and a driving voltage that drives the B phase, each 10-wave A-phase standing wave and 10-wave B-phase standing wave having different driving phases are excited, so that a 10-wave traveling wave that is a composite wave of these standing waves is obtained.

Accordingly, in the present invention, it is possible to excite a traveling wave of a (2k+1)n wave using a 4nX piezoelectric members. In other words, it is understood that the first and second embodiments correspond to the case in which k=1 in the third embodiment.

REFERENCE NUMERALS 1 stator
2 vibrating member
3~6 piezoelectric element
7 piezoelectric member
8, 9 electrode
11 contactor
12 holding plate
12a holding portion
13 bolt
14 holding member
15 base plate
16 rotor
17 interval
21 ultrasonic motor
31 stator
32 vibrating member
33~36 piezoelectric element
41 stator
42 vibrating member
43~46 piezoelectric element
51~58 piezoelectric element
61~63 piezoelectric element
61a~61d first to fourth sides
62a~62d first to fourth sides
63a~63d first to fourth sides
71 stator
72~88 piezoelectric element

The invention claimed is:

1. An ultrasonic motor comprising:
a stator; and
a rotor,
wherein the stator includes
a vibrating member having a circular or polygonal outer circumferential edge; and
4n piezoelectric elements secured to a first surface of the vibrating member and configured to generate a 3n wave that travels in a circulating manner when the vibrating member vibrates, the 4n piezoelectric elements being disposed in a circumferential direction of the vibrating member along a direction in which the 3n wave circulates,
wherein n is a natural number,
wherein a center angle around a center of the vibrating member in the circumferential direction and corresponding to a wavelength of the 3n wave is $\lambda_\theta$, each piezoelectric element has a size corresponding to $\lambda_\theta/2$ of the center angle, and adjacent piezoelectric elements of the 4n piezoelectric elements are separated from each other by an interval corresponding to $\lambda_\theta/4$ the center angle along the circumferential direction,
wherein each 4n piezoelectric element includes a piezoelectric member and a pair of electrodes on opposed respective surfaces of the piezoelectric member,
wherein the piezoelectric member of each 4n piezoelectric element is polarized in a same thickness direction as the piezoelectric member of the 4n piezoelectric element adjacent thereto at a first side thereof in the circumferential direction,
wherein the piezoelectric member of each 4n piezoelectric element is polarized in an opposite thickness direction to the piezoelectric member of the 4n piezoelectric element adjacent thereto at a second side thereof in the circumferential direction, and
wherein the rotor is disposed so as to be in contact with the stator, the rotor configured to rotate by receiving vibration resulting from the 3n-wave generated by the stator.

2. The ultrasonic motor according to claim 1, wherein the plurality of piezoelectric elements are disposed point-symmetrically with respect to the center of the vibrating member.

3. The ultrasonic motor according to claim 1, wherein each piezoelectric element has a first side, positioned towards the center of the vibrating member, a second side, positioned opposite to the first side, and a third side and a four side, which connect the first and second sides to each other.

4. The ultrasonic motor according to claim 3, wherein each piezoelectric element has a rectangular planar shape.

5. The ultrasonic motor according to claim 4, wherein, in each rectangular shape, a distance between a center point of the third side and a center point of the fourth side corresponds to $\lambda_\theta/2$ of the center angle.

6. The ultrasonic motor according to claim 1, further comprising a holding member that holds the vibrating member.

7. The ultrasonic motor according to claim 6, wherein the holding member is connected to a second surface of the vibrating member, the first surface of the vibrating member is opposite to the second surface and corresponds to a portion where the vibrating member contacts the rotor.

8. The ultrasonic motor according to claim 7, further comprising a contactor provided at the first surface of the vibrating member, the contactor protruding from the first surface of the vibrating member.

9. The ultrasonic motor according to claim 1, wherein vibrating member has a planar ring shape.

10. An ultrasonic motor comprising:
a stator; and
a rotor,
wherein the stator includes
a vibrating member having a circular or polygonal outer circumferential edge; and
4n piezoelectric elements secured to a first surface of the vibrating member and configured to generate a (2k+1)n wave that travels in a circulating manner when the vibrating member vibrates, the 4n piezoelectric elements being disposed in a circumferential direction of the vibrating member along a direction in which the (2k+1)n wave of the vibrating member circulates,
wherein n and k are natural numbers,
wherein each 4n piezoelectric element includes a piezoelectric member and a pair of electrodes on opposed respective surfaces of the piezoelectric member,
wherein the piezoelectric member of each 4n piezoelectric element has a k number of polarization areas provided side by side in the circumferential direction, wherein a center angle around a center of the vibrating member in the circumferential direction and corresponding to a wavelength of the (2k+1)n wave is $\lambda_\theta$, each polarization area has a size corresponding to $\lambda_\theta/2$ of the center angle, and adjacent piezoelectric elements of the 4n piezoelectric elements are separated from each other by an interval corresponding to $\lambda_\theta/4$ of the center angle, wherein the polarization areas that are adjacent to each other are polarized in opposite thickness directions, wherein, in the 4n piezoelectric elements, polarization directions of the k number of polarization areas of each piezoelectric element are arranged such that the polarization direction of the k number of polarization areas of each piezoelectric element is in a same direction as the polarization direction of the k number of polarization areas of the piezoelectric element adjacent thereto at a first side in the circumferential direction and arranged such that the polarization direction of the k number of polarization areas of each piezoelectric element is in a direction opposite to the polarization direction of the k number of polarization areas of the piezoelectric element adjacent thereto at a second side, and wherein the rotor is in contact with the stator, the rotor being configured to rotate by receiving vibration resulting from the (2k+1)n wave generated by the stator.

11. The ultrasonic motor according to claim 10, wherein the plurality of piezoelectric elements are disposed point-symmetrically with respect to the center of the vibrating member.

12. The ultrasonic motor according to claim 10, wherein each piezoelectric element has a first side, positioned towards the center of the vibrating member, a second side, positioned opposite to the first side, and a third side and a four side, which connect the first and second sides to each other.

13. The ultrasonic motor according to claim 12, wherein each piezoelectric element has a rectangular planar shape.

14. The ultrasonic motor according to claim 13, wherein, in each rectangular shape, a distance between the center point of the third side and a center point of the fourth side corresponds to $\lambda_\theta/2$ of the center angle.

15. The ultrasonic motor according to claim 10, further comprising a holding member that holds the vibrating member.

16. The ultrasonic motor according to claim 15, wherein the holding member is connected to a second surface of the vibrating member, and the first surface of the vibrating member is opposite to the second surface and corresponds to a portion where the vibrating member contacts the rotor.

17. The ultrasonic motor according to claim 16, further comprising a contactor provided at the first surface of the vibrating member, the contactor protruding from the first surface of the vibrating member.

18. The ultrasonic motor according to claim 10, wherein the vibrating member has a planar ring shape.

* * * * *